UNITED STATES PATENT OFFICE.

HENRY ANHALTZER, OF PITTSBURG, PENNSYLVANIA.

MAKING A CEREAL BREAKFAST FOOD.

976,332.  Specification of Letters Patent.  Patented Nov. 22, 1910.

No Drawing.  Application filed January 4, 1909. Serial No. 470,574.

*To all whom it may concern:*

Be it known that I, HENRY ANHALTZER, a citizen of the United States of America, residing at Pittsburg, in the county of Allegheny and State of Pennsylvania, have invented certain new and useful Improvements in Making a Cereal Breakfast Food, of which the following is a specification.

This invention relates to a process of making a cereal breakfast food, and has for its object to provide a process for expeditiously making a cereal food that will be highly nutritious as a food stuff, palatable and pleasing to the taste.

My invention aims to make a food stuff from wheat, rye, corn or a similar grain, and add to the same certain ingredients that will add to the digestive qualities of a food stuff without impairing the wholesomeness of the product.

My invention involves a process wherein ingredients are separately prepared and then collectively treated, to provide a food stuff from which greasy substances like fat and butter are eliminated, and a product provided that will not deteriorate the wholesomeness of the product as a health food.

The first step in my process is the treatment of the basic ingredients and as an instance, I use wheat flour and an avoirdupois pound of flour is mixed with cold water, about six ounces, to produce a plastic or dough like substance having a consistency somewhat like that of putty. Prior to placing the water in the flour, I dissolve four grains of pepsin in the water, and then thoroughly mix the water with the flour. Since chemical pure pepsin will digest three thousand times its weight in food, therefor four grains of pepsin represent the digesting power to twelve thousand grains of food, and since one pound of flour weighs only seven thousand grains, it is obvious that this preparation will not only be easy to digest, but at the same time will aid the digestion of other food consumed along with it. Of course, the proportion of the pepsin can be altered to a certain degree, without impairing the wholesomeness of the product. After the plastic is thus prepared, I convert it with the aid of special machinery into thin flake-like films, depositing them upon perforated porcelain or other suitable receptacles and dry them in a vacuum or ordinary oven at a heat of about 50 to 60 degrees centigrade, which will consume about 10 to 30 minutes of time according to the construction of the oven employed. After thoroughly dry, I place them in a metallic and enameled or other suitable drum or retort, which is kept in a continuous revolving motion in an especially built oven and heated until all the flakes are uniformly roasted, which will be accomplished in from 15 to 30 minutes of time, according to quantity deposited in drum for roasting purposes.

The next step in my process is to prepare a liquid extract or ingredient. For this purpose, I use the coffee beans, which are ground, mixed with water in any suitable proportion and boiled in air tight vessels, to retain their fragrance or aroma. To the filtered coffee liquid, I add pure milk and sugar, the latter for the following purposes, to wit; first, to sweeten the product and secondly, as a preservative. The proportion of these ingredients can be varied to suit the taste, but always producing a liquid preparation commonly known as white coffee. These liquid ingredients to be hereinafter termed white coffee, are reduced with the aid of suitable machinery into a powder, the process involved being as follows;—The white coffee is placed in a specially designed vacuum evaporating vessel, built in a manner that no aroma can escape. The white coffee is evaporated with a heat of approximately 60 degrees centigrade, and is evaporated under constant stirring which can be accomplished automatically. After the white coffee is of a consistency of thick syrup, it is cooled in an air tight receptacle, and by reason of its sugary and fatty chemical compounds, the white coffee plastic is gummy and of a tough texture. This tough and gummy resultant is now mixed with finely powdered sugar by kneading the latter into the former to sufficiently transform the resultant from a plastic and gummy condition to a porous and brittle state, allowing the matter to be cut or otherwise shaped into granules by a suitable machine. The granules are then placed upon porcelain or other suitable receptacles and inserted into a vacuum or ordinary oven and dried by heat to approximately 50 degrees centigrade. Requiring about 10 to 30 minutes according to the construction of the oven. After the granules are fully dried, said granules are ground to a fine powder which will dissolve readily and possess the aroma of freshly prepared coffee, and which can be kept for any period of time without losing any strength or flavor, or without decomposing. The next step of my process is to mix this powder, with the roasted cereal flakes previously prepared in any suitable proportion and with the aid of suitable machinery, whereby the cereal flakes will become incrusted with the coffee powder, rendering both in one homogeneous body. This is accomplished by the following process;—Since the coffee powder contains a large proportion of sugar and since some of the chemical components of coffee as also of milk are fat and sugar, which have the tendency to melt in heat, I plainly plunge the coffee powder upon the roasted cereal flakes while they are still hot and keep the drum revolving until the product cools, thereby causing the powder to mix with the cereal flakes thoroughly, and adhere to the flakes crustlike.

A cereal prepared by this process will keep indefinitely and will render at all and any time a deliciously flavored and palatable, wholesome rich food, the incrustation of which, when milk or any other suitable liquid, (even water) is poured over it, will dissolve immediately, in which state the cereal is usually consumed. Certain brands of this finished product for instance, the one incrusted with chocolate or cocoa, I prefer to scent, aside of its incrustation, with suitable essential extracts, like vanilla, etc., imparting to it a still higher degree of palatability.

As the finished product in its incrustation contains milk and sugar, both of which are in itself highly nutritious, they increase to a very high degree the nourishing qualities of the cereal food product.

Having now described my invention, what I claim as new, is;—

A process for manufacturing a food product consisting in converting a plastic substance composed of a cereal, water and pepsin into thin films, then thoroughly drying the films, then roasting the films and then while maintaining the films in a heated condition applying thereto a flavoring powder consisting of desiccated coffee, sugar and milk, while keeping the mass in a state of agitation and continuing the agitation until the films have become cool and a uniformly incrusting coating is formed thereon.

In testimony whereof I affix my signature in the presence of two witnesses.

HENRY ANHALTZER.

Witnesses:
K. H. BUTLER,
R. L. FARRINGTON.